United States Patent
Yeung

(10) Patent No.: US 6,230,649 B1
(45) Date of Patent: May 15, 2001

(54) COOKING THERMOMETER

(75) Inventor: Chun-Man Yeung, Hong Kong (HK)

(73) Assignee: Sunderland Holdings Limited, Hong Kong (HK)

( * ) Notice: Subject to any disclaimer, the term of this patent is extended or adjusted under 35 U.S.C. 154(b) by 0 days.

(21) Appl. No.: 09/226,391

(22) Filed: Jan. 6, 1999

(51) Int. Cl.⁷ .................................................. G01K 5/48
(52) U.S. Cl. ............................ 116/102; 116/216; 374/155
(58) Field of Search ..................... 374/106, 155, 374/205, 206, 207; 428/88; 116/102, 101, 216, 218, 221; 99/344

(56) References Cited

U.S. PATENT DOCUMENTS

| | | | |
|---|---|---|---|
| 3,709,141 | * | 1/1973 | Schwartzstein ......................... 99/343 |
| 4,083,250 | * | 4/1978 | Goff et al. ............................ 374/155 |
| 4,089,222 | * | 5/1978 | Perkins ................................. 116/101 |
| 5,143,453 | * | 9/1992 | Weynent Nee Girones ........ 374/205 |
| 5,263,644 | * | 11/1993 | Chen et al. ...................... 236/101 R |
| 6,006,939 | * | 12/1999 | Wai ................................. 220/203.15 |

FOREIGN PATENT DOCUMENTS

| | | | |
|---|---|---|---|
| 217851 | * | 1/1957 | (AU) ................................... 116/101 |
| 272541 | * | 3/1951 | (CH) ................................... 116/101 |
| 2315126 | * | 1/1998 | (GB) . |

* cited by examiner

Primary Examiner—Andrew H. Hirshfeld
Assistant Examiner—R. A. Smith
(74) Attorney, Agent, or Firm—Jackson Walker L.L.P.

(57) ABSTRACT

A monitoring cooking thermometer includes a shape memory alloy activated probe for entering into food being cooked. A clockwork mechanical mechanism in a body fits to the top of the probe. When the food reaches a predetermined temperature a mechanical bell is sounded and a flag is exposed outside the body.

2 Claims, 2 Drawing Sheets

COOKING THERMOMETER

BACKGROUND OF THE INVENTION

1. Field of the Invention

The invention relates to cooking thermometers.

2. Description of Prior Art

The invention relates more particularly to a cooking thermometer that monitors the temperature of roasting meat. Such a thermometer is described in U.K. Patent Application No. 2315126. The main disadvantage of that described thermometer is that the visual indication may be overlooked, especially if the roasting meat is behind an opaque closed oven door, and so the meat may easily be overcooked in practice.

SUMMARY OF THE INVENTION

It is an object of the invention to overcome or at least to reduce this problem.

According to the invention there is provided a monitoring cooking thermometer arranged to be heated with food that is to be monitored including an elongate probe that has first end and for entering into the food and second end to fit to a wind-up audible alarm mechanism, including an SMA actuator inside the first end of the probe and a latch mechanically coupled to the actuator to release the wind-up mechanism and causes the ball to ring when the end of the probe rises to a predetermined temperature.

The latch is preferably arranged to be moved away from the winding mechanism by the SMA actuator to release the mechanism.

The monitoring cooking thermometer may include a movable flag mounted to the mechanism that provides a visual indication that the alarm has been initiated.

The alarm mechanism may include a coilable spring that provides stored mechanical energy for operating the alarm, in which the flag is spring biased against an external coil of the spring so as to move towards and away from the spring when it is wound up and unwinds respectively.

Most of the components of the alarm mechanism are preferably made of stainless steel.

BRIEF DESCRIPTION OF THE DRAWINGS

A monitoring cooking thermometer according to the invention will now be described by way of example with reference to the accompanying drawings in which.

DESCRIPTION OF THE PREFERRED EMBODIMENT

Figure 1:
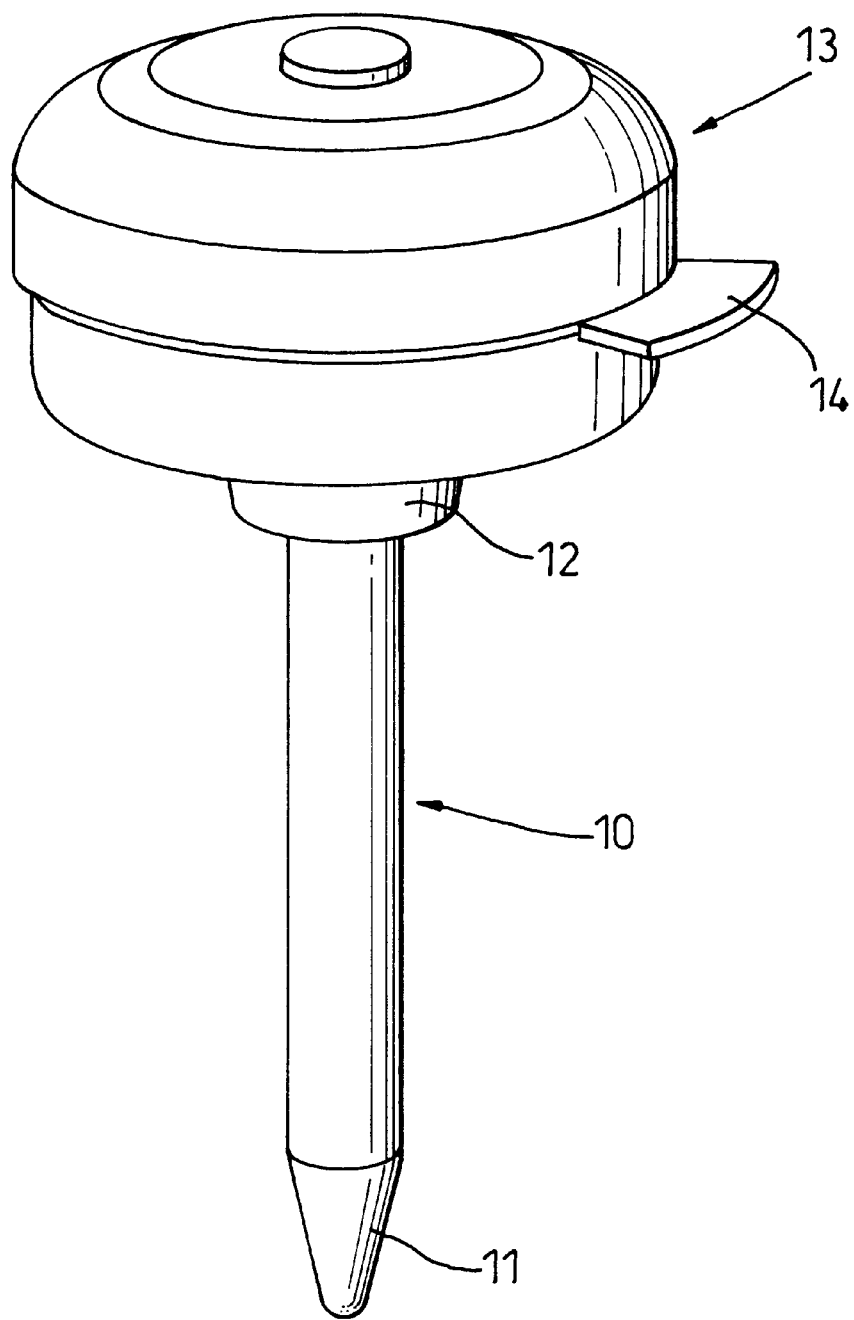
FIG. 1 is an isometric view of the thermometer.

Referring to the drawings, in FIG. 1 the thermometer has an elongate probe 10 that is pointed at one end 11 and is held at its other end by a screwed flange 12 to a body 13 that contains mechanical mechanism. A flag 14 is shown extending out of a side of the body 13. In use, the probe 10 is plunged into a joint of meat and placed in an oven with the meat. When the meat is properly cooked, an audible alarm is initiated, driven by the mechanical mechanism, and the flag 14 moves out of the body 13 to the position shown in FIG. 1.

Figure 2:
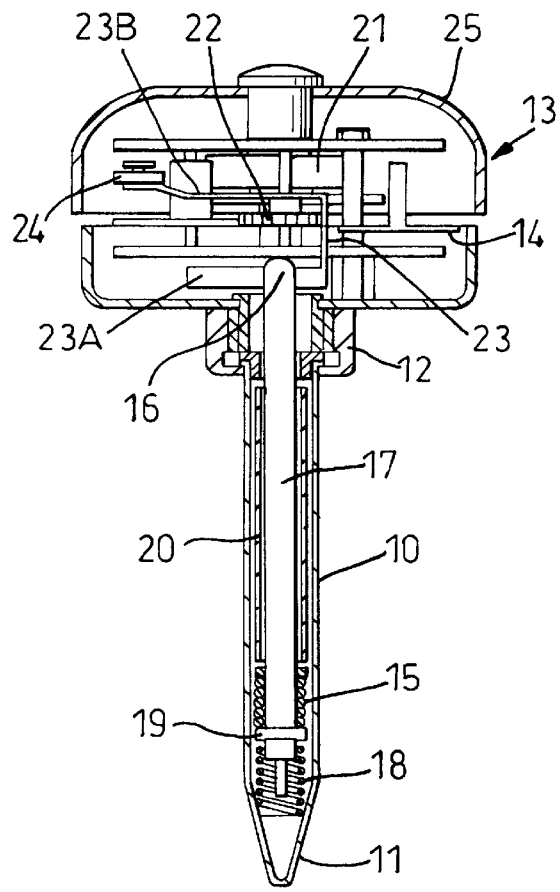
FIG. 2 is a sectional front view of the thermometer in one operative position.
Figure 3:
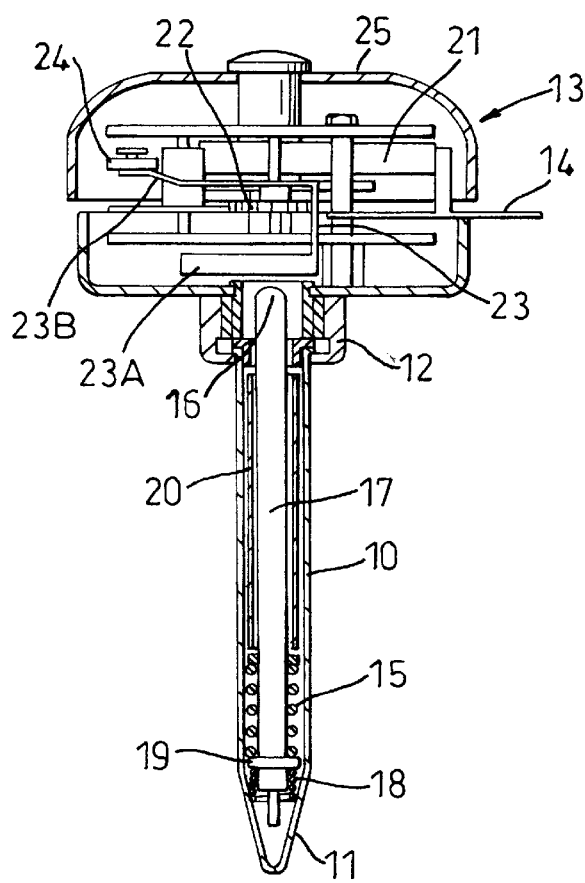
FIG. 3 is a sectional front view of the thermometer in a second operative position.

In FIGS. 2 and 3, it can be seen that the probe contains a shaped memory alloy (SMA) actuator in the form of a coiled spring 15. A mechanical latch 16 is provided in the form of an end of a rod 17 that extends down inside the probe 10. The rod 17 is biassed upwards by a coil spring 18 and mechanically coupled to the actuator 15 by bearing against a circlip 19. When the actuator 15 rises to a predetermined temperature it expands, as shown in FIG. 2, to move the rod downwards and away from the mechanical mechanism to release the latch 16. The actuator 15 is prevented from moving upwards by a cylindrical sleeve 20 inside the probe that surrounds the rod 17.

The body 13 contains the mechanical mechanism that comprises a generally conventional clockwise type arrangement with a coil spring 21, gearing (including a gear 22), and a U-shaped pivoted clockwork-escape racket 23. The racket extends along one side 23A where it can engage the latch 16 and along another side 23B to loosely support at its remote end a circular striker 24. A bell housing 25 forms a top of the body 13 and the striker 24 is positioned to vibrate against the inside surface of the housing 25 to provide an audible alarm when the clockwork mechanism unwinds.

In order to wind up the clockwork mechanism, the housing 25 is rotated relative to the base of the housing 13. The spring 21 becomes therefore coiled up more tightly, as required. The latch 16, when it is in the position shown in FIG. 1, prevents the spring unwinding because the latch holds the racket 23 to prevent any reverse movement of the gear 22. If the latch 16 is withdrawn, as in FIG. 2, the gear 22 is freed to move and allow the coil spring to unwind. As the gear moves it rocks the racket 23 in conventional manner so that the striker 24 hits against the housing 25.

Figure 4:
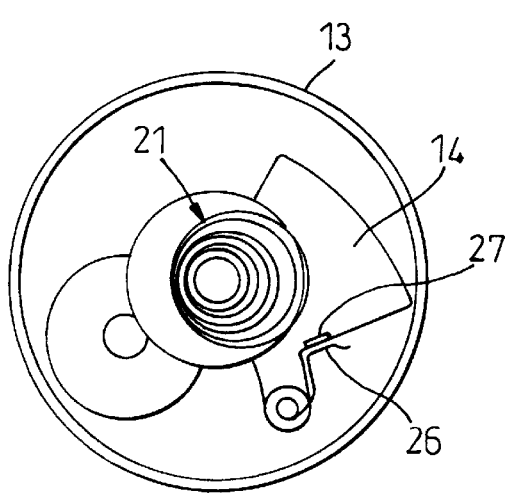
FIG. 4 is a schematic top plan view of the thermometer in the one operative position.
Figure 5:
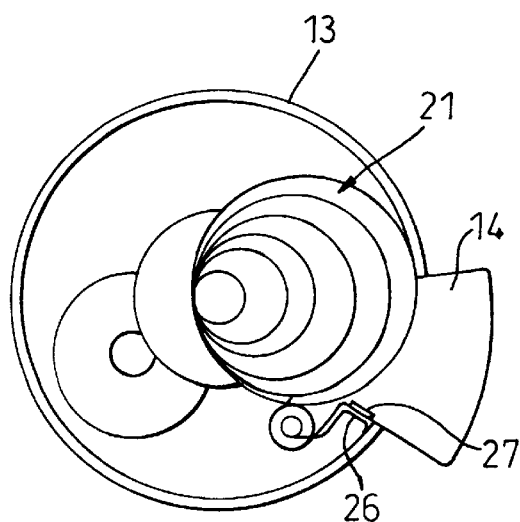
FIG. 5 is a schematic top plan view of the thermometer in the second operative position.

It was mentioned earlier that the flag 14 also provides a visual indication of when a joint of meat has been properly cooked. The operation of the flag is better shown in FIGS. 4 and 5. The flag 14 is pivotably mounted in the body 13 and biassed by a wire spring 26 towards a central axis of the body 13. An upstanding tongue 27 on a top surface of the flag bears against an outer coil of the spring 21. In FIG. 4 when the coil spring 21 is fully wound up, the flag lies wholly inside the body 13. In FIG. 5 when the coil spring is nearly or fully unwound, the flag 14 lies predominantly outside the body 13 as required.

The described monitoring cooking thermometer thus provides an audible alarm and a visible alarm that cooking has been completed. As the actuator is formed by an SMA element, it automatically resets for repeated use and allows the clockwork mechanism to be wound up for each cooking cycle. The probe 10 is easily removed by unscrewing the flange 12 which means that the probe can be cleaned separately. It also enables other probes of different length and/or containing different SMA actuators to be fitted to the body 13. This may be necessary as different kinds of meat (beef, pork and chicken, or even fish) are properly cooked only when reaching different respective temperatures.

It is most preferable to make the components of the clockwork mechanism at least predominantly of stainless steel, but other high temperature-stable materials may be used.

What is claimed is:

1. A monitoring cooking thermometer arranged to be heated with food that is to be monitored comprising:

an elongate probe that has a first end for entering into the food and a second end to fit to a wind-up clockwork audible alarm mechanism;

a shape memory alloy actuator inside the first end of the probe;

a latch mechanically coupled to the actuator to release the wind-up mechanism and cause a bell to ring when the first end of the probe rises to a predetermined temperature, the latch being arranged to be moved toward said first end and away from the wind-up mechanism by the shape memory alloy actuator to release the mechanism; and a movable flag mounted to the wind-up mechanism that provides a visual indication that the alarm has been initiated.

2. A monitoring cooking thermometer according to claim 1, wherein the wind-up mechanism further comprises a coilable spring that provides stored mechanical energy for operating the alarm, the flag spring biased against an external coil of the spring so as to move towards and away from the spring when the spring is wound up and unwinds respectively.

* * * * *